May 12, 1942. D. DYRESEN 2,282,996
FASTENER MEMBER
Filed Sept. 14, 1940
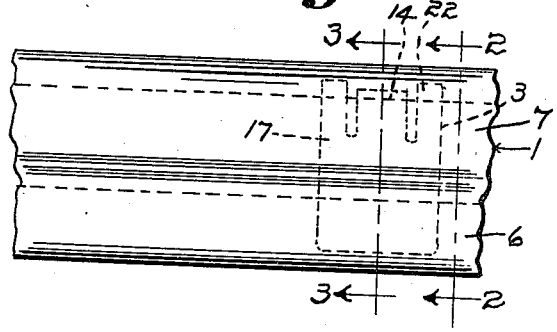
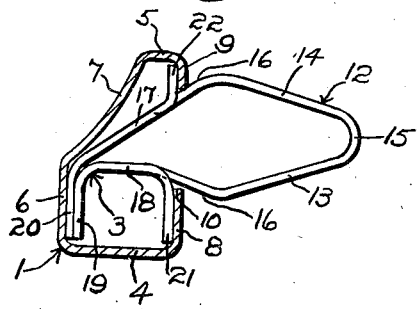
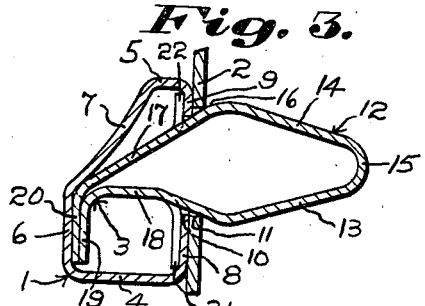
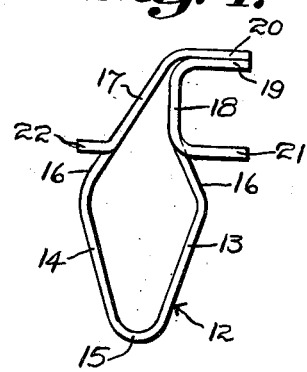
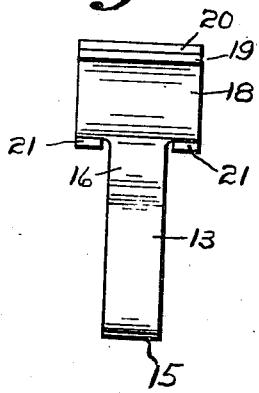
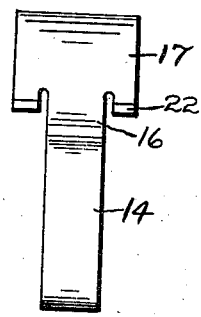
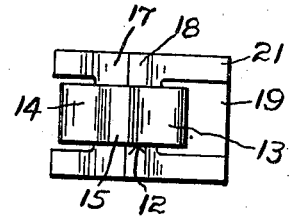
Inventor:
Didrick Dyresen.
By John Todd
Att'y.

Patented May 12, 1942

2,282,996

UNITED STATES PATENT OFFICE 2,282,996

FASTENER MEMBER

Didrick Dyresen, Billerica, Mass.

Application September 14, 1940, Serial No. 356,792

7 Claims. (Cl. 189—88)

This invention relates to snap fastener members of the type adaptable for fastening two apertured bodies together.

In the drawing, in which I have illustrated a preferred embodiment of my invention:

Fig. 1 is a front elevation of a molding strip with my improved fastener member, which is shown in dotted lines, assembled therewith;

Fig. 2 is a section taken along the line 2—2 of Fig. 1;

Fig. 3 is a section taken along the line 3—3 of Fig. 1 and showing the molding strip secured to a supporting panel;

Fig. 4 is a side view of my improved fastener member per se;

Fig. 5 is a front view of my improved fastener member per se;

Fig. 6 is a rear view of my improved fastener per se; and

Fig. 7 is a bottom view of my improved fastener member per se.

My invention, as illustrated in the accompanying drawing, relates specifically, though not exclusively, to a fastener for securing a hollow body such as a molding strip to a supporting structure such as the frame of an automobile.

The particular installation which I have chosen for the purpose of illustrating my invention includes a hollow sheet metal strip 1 secured to a supporting structure 2 (Fig. 3) by means of my improved fastener member 3. The hollow strip 1 is of the type commonly used for ornamenting exterior surfaces of an automobile body and the like and, in my preferred form, is of irregular cross-sectional shape. The molding strip which I have chosen to illustrate provides parallel side walls 4 and 5, a top wall connecting the side walls 4 and 5 having a high portion 6 and a sloping portion 7, and a bottom wall spaced from the top wall having inturned flanges 8 and 9 adjacent a longitudinal opening 10. The supporting structure 2, which is preferably of thin metal material, has an aperture 11 to receive a stud shank of the fastener means (Fig. 3).

Referring to my preferred form of fastener member, I have shown one of my simple construction and constructed from one piece of spring metal. The fastener is formed by bending a strip of sheet metal intermediate its ends so as to form a shank 12 having a pair of opposed resilient shank elements 13 and 14. The shank elements diverge from a nose 15 at their connected ends and then converge to provide shoulders 16. Head sections 17 and 18 are provided from the free ends of the shank elements 13 and 14 and are preferably of greater width than the shank elements. The head section 18 has a right-angular bend 19 adjacent its free end and the head section 17 is bent to provide a free end portion 20 extending laterally in the same direction as the end portion 19 and disposed in parallel, substantially abuttable relation to the end portion 19. The head section 18 provides a pair of lugs 21 on opposite sides of the shank element 13 extending outwardly in substantially perpendicular relation to the head section and in spaced parallel relation to the end portions 19 and 20. The head section 17 has a pair of lug portions 22 on opposite sides of the shank element 14 extending outwardly from the head section in substantially perpendicular relation to the axis of the shank 12. The lug portions 21 and 22 extend in opposite directions and, in my preferred construction, are disposed substantially in the same plane.

In assembling the parts of the installation, it is desirable first to secure the fastener member in engagement with the hollow molding. This may be accomplished quickly and easily by moving the head sections of the fastener member into the hollow molding by longitudinal sliding movement through an open end of the molding. As a result the head sections of the fastener member are assembled within the molding so that the end portion 20, which is supported by the end portion 19, engages the high portion 6 and the lug portions 21 and 22 engage the flange portions 8 and 9 respectively. The lug portions 21 and end portion 20 may be spaced apart a distance slightly greater than the distance between the high portion 6 and the flange 8 so that portions of the fastener exert a slight drag on the walls of the molding to hold the fastener member in predetermined position along the length of the molding. Thus the fastener member is formed in a way to substantially fit the inside contour of the molding and effect a rattle-proof assembly between the parts. Although I have shown only one fastener member in assembly with the molding, it is understood that as many fasteners may be provided as are necessary for attaching the molding to the supporting structure. The molding may be secured to the supporting panel 2 by aligning the shank of the fastener member with the opening 11 of the panel and then exerting downward pressure upon the molding to force the shoulders 16—16 of the shank element through the opening whereby the shank effects a snap fastener engagement with the support.

Although I have illustrated and described a preferred embodiment of my invention, I do not wish to be limited thereby because the scope of my invention is best defined by the following claims.

I claim:

1. A fastener member for securing a hollow member to a supporting structure, said fastener having a shank comprising a pair of shank elements, at least one of which is shouldered, head sections provided from the free ends of said shank elements and adapted to be carried by said hollow member, said head sections having portions in parallel relation on one side of the axis of said shank to engage said hollow member.

2. A fastener member for securing a hollow member to a supporting structure, said fastener having a shank comprising a pair of shank elements, at least one of which is shouldered, head sections provided from the free ends of said shank elements and adapted to be carried by said hollow member, said head sections having portions in parallel abuttable relation on one side of the axis of said shank to engage said hollow member.

3. A fastener member for securing a hollow member to a supporting structure, said fastener having a shank comprising a pair of shank elements, at least one of which is shouldered, head sections provided from the free ends of said shank elements and adapted to be carried by said hollow member, said head sections having strengthening portions extending at substantially right angles to the axis of said shank and said strengthening portions providing surfaces in parallel, substantially abuttable relation.

4. A fastener member for securing a hollow member to a supporting structure, said fastener having a shank comprising a pair of shank elements at least one of which is shouldered, head sections provided from the free ends of said shank elements and adapted to be carried by said hollow member, said head sections having strengthening portions extending at substantially right angles to the axis of said shank, said strengthening portions providing surfaces in parallel substantially abuttable relation to engage one part of said hollow member and at least one of said head sections having a portion in spaced relation to said strengthening portions to engage another part of said hollow member.

5. A fastener member for securing a hollow member to a supporting structure, said fastener having a shank comprising a pair of shank elements at least one of which is shouldered, head sections provided from the free ends of said shank elements and adapted to be carried by said hollow member, said head sections having strengthening portions extending at substantially right angles to the axis of said shank, said strengthening portions providing surfaces in parallel substantially abuttable relation to engage one part of said hollow member, and at least one of said head sections having a lug portion extending out of the plane of said head section, said lug portion being in spaced substantially parallel relation to said strengthening portions to engage another part of said hollow member.

6. A fastener installation comprising a hollow member having a slot in one side thereof, a fastener member for securing said hollow member to a supporting structure, said fastener having head sections carried by said hollow member, said head sections being disposed within said hollow member and having strengthening portions in superposed abutting relation so as to provide a double thickness directly engaging an inner surface of a part of said hollow member, and shank elements extending from said head sections through said slot of said hollow member for fastener engagement with a supporting part.

7. A fastener installation comprising a hollow member, having a slot in one side thereof, a fastener member for securing said hollow member to a supporting structure, said fastener having head sections carried by said hollow member, said head sections being disposed in said hollow member and having strengthening portions in superposed abutting relation so as to provide a double thickness directly engaging an inner surface of a part of said hollow member, at least one of said head sections having a portion in spaced relation to said double thickness engaging another part of said hollow member, and shank elements extending from said head sections through said slot of said hollow member for fastener engagement with a supporting structure.

DIDRICK DYRESEN.